United States Patent [19]

Hartman et al.

[11] Patent Number: 5,631,656
[45] Date of Patent: May 20, 1997

[54] FAIL SAFE SYSTEM WITH COMMON MODE AVOIDANCE

[75] Inventors: Randolph G. Hartman, Plymouth, Minn.; Robert D. Girts, Mesa, Ariz.

[73] Assignee: Honeywell Inc., Minneapolis, Minn.

[21] Appl. No.: 397,297

[22] Filed: Mar. 1, 1995

[51] Int. Cl.⁶ .......................... G01S 5/02; G06F 19/00; A01S 13/00
[52] U.S. Cl. .................... 342/357; 364/424.034; 342/173
[58] Field of Search .................... 342/357, 173; 364/424.03, 439

[56] References Cited

U.S. PATENT DOCUMENTS

| | | |
|---|---|---|
| 4,405,986 | 9/1983 | Gray ........................... 364/434 |
| 4,963,889 | 10/1990 | Hatch ......................... 342/357 |
| 5,021,792 | 6/1991 | Hwang ........................ 342/357 |
| 5,072,227 | 12/1991 | Hatch ......................... 342/357 |
| 5,177,489 | 1/1993 | Hatch ......................... 342/357 |
| 5,184,304 | 2/1993 | Huddle ........................ 364/453 |
| 5,185,610 | 2/1993 | Ward et al. .................. 342/357 |
| 5,274,554 | 12/1993 | Takats et al. ............. 364/424.03 |
| 5,394,333 | 2/1995 | Kao ............................ 364/450 |
| 5,461,388 | 10/1995 | Applegate et al. .......... 342/357 |

*Primary Examiner*—Gregory C. Issing
*Attorney, Agent, or Firm*—Charles J. Ungemach

[57] ABSTRACT

A fail operational system including two sets of first and second sensors responsive to different stimuli to produce signals indicative of a condition, and a comparator for comparing the outputs of the first and second sensors to produce a "valid" signal when the outputs are substantially the same.

7 Claims, 1 Drawing Sheet

FAIL SAFE SYSTEM WITH COMMON MODE AVOIDANCE

BACKGROUND OF INVENTION

1. Field of the Invention

The present invention relates to "fail safe", or "fail passive" and "fail operational" systems such as those used to provide position and attitude information to the flight control system of an aircraft and more particularly to such systems which are also safe from "common mode" failures.

2. Description of the Prior Art

Systems for providing information indicative of position (for example, deviations from an ILS beam or altitude, latitude and longitude) and indicative of attitude (for example, the RF signals from an ILS or the signals from gyros and accelerometers indicative of pitch, roll and yaw) for use in vehicles such as aircraft, are well known in the art. Traditional systems employ gyroscopes and accelerometers while more recent systems use transmitted information from several satellites. Since high performance aircraft need a high degree of integrity including accuracy and dependability, and since in some situations, for example, "precision approaches", two or three unique data sources are required to meet certification, "fail safe" and "fail operational" systems have been devised. "Fail safe" systems employ two redundant sensing systems whose outputs are checked against each other and if they are not the same, a failure is known and both outputs are discarded. "Fail operational" systems employ three or more redundant sensing systems and an associated algorithm to compare the outputs of the sensing systems and detect when one of them differs from the others. When this occurs, the erroneous output is discarded but the outputs of the other sensing systems may be used to control the aircraft. Prior art fail operational systems are generally classified as either:

1) Triplex system with three or more sensing systems each producing an output indicative of the same condition. The outputs of the sensing systems are checked against each other and if one differs from the others it is discarded and the other outputs are used. An example of such a system may be found on the Boeing 747.

2) Dual-dual systems with two or more pairs of sensing systems each sensing system producing an output indicative of the same condition. The outputs of the sensing systems of each pair are checked against each other and if they are not the same, then the output of that pair is discarded and the output from the other pair or pairs is used. As an example, such a system may be found on the Douglas MD-11.

Furthermore, in Category IIIb decision approaches, (unpiloted landing), only fail operational systems can be used thus requiring at least three data sources.

Many fail safe and fail operational systems are vulnerable to a "common mode" failure i.e. a problem that effects all of the sensors in the same manner so that their outputs are all in error by the same amount. When this occurs, the comparison of the outputs may indicate the signals are valid when in reality none of the signals can be relied on.

BRIEF DESCRIPTION OF THE PRESENT INVENTION

The present invention overcomes the "common mode" problem by utilizing two dissimilar sensing systems, for example, inertial reference systems (IRS) which utilize inertial equipment such as gyros and accelerometers and together are often referred to as an inertial reference unit (IRU) and satellite navigation equipment such as a global position system (GPS). These systems are responsive to entirely different measurement and computation techniques and thus can never have a common erroneous factor which has the same effect on both of the sensing systems. When the output of the GPS receiver is checked against the output of the IRU, the system is referred to as "fully monitored". In the implementation of the present invention, two parallel fully monitored attitude and navigation systems are employed with each performing a check between the IRU and the GPS receiver outputs to determine if they are valid. If one system fails the validity test, the other may be used so that fail operational performance is provided. Furthermore, since they are set up in a dual-dual arrangement, they may be substituted directly into aircraft using the present dual-dual operation such as the Douglas MD-11. For systems using triplex arrangements such as the Boeing 747, the dual-dual arrangement of the present invention can be substituted for two of the three systems with the third being used for a further cross check if desired. It is also possible to implement the present invention with three fully monitored components to produce the outputs and thus employ them directly in the triplex system.

As mentioned, both the inertial reference unit (IRU) and the global position system (GPS) receiver produce outputs indicative of aircraft position and attitude. The IRU uses gyros and accelerometers which are very accurate in determining attitude but somewhat less accurate in determining position while the GPS receiver obtains signals from a plurality of satellites and is very accurate in determining position and is somewhat less accurate in determining attitude. Though there may be small differences, the position information from the IRU is sufficiently accurate to check the position information from the GPS receiver and the attitude information from the GPS is sufficiently accurate to check the attitude information from the IRU.

After the integrity check is performed, the information concerning position from the GPS receiver and the information concerning attitude from the IRU is provided to the flight control system of the aircraft. Accordingly, the fail operational operation is provided and since the two systems do not use any information common to both, common mode failures are avoided.

DETAILED DESCRIPTION OF THE PREFERRED EMBODIMENT

Figure 1:
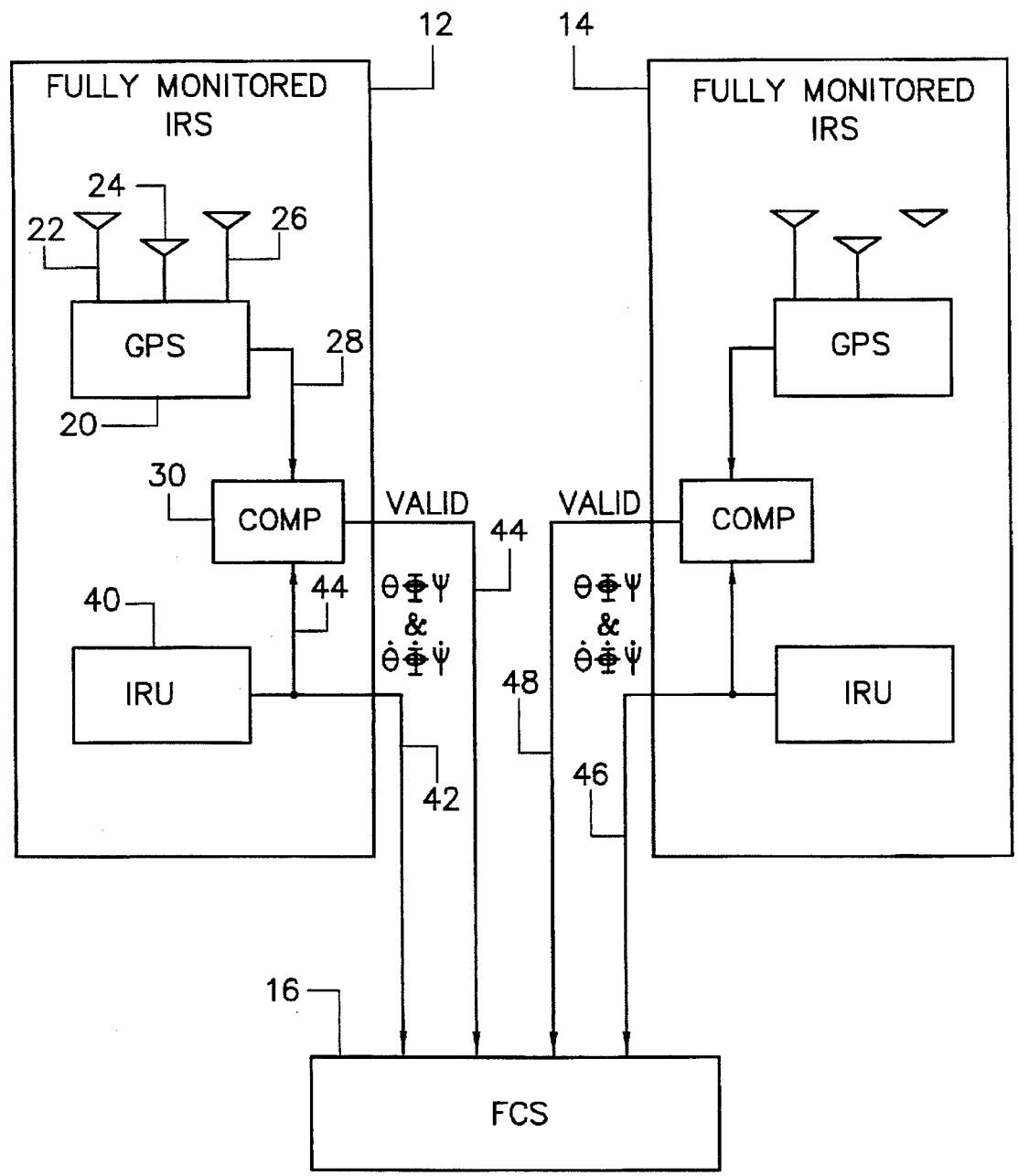
FIG. 1 shows a block diagram of the present invention.

For simplicity, the present invention will be described in connection with producing a fail operational or "fully monitored" inertial attitude reference system although it will be understood that a fully monitored position reference system or indeed any other aircraft or other system which needs fail operational performance without common mode errors can be made using the same concepts.

In FIG. 1, two fully monitored inertial reference systems, IRS, or alternately, AHARS 12 and 14 are shown in a dual-dual arrangement for use in providing pitch ($\Theta$)), pitch rate ($\dot{\Theta}$), roll ($\Phi$), roll rate ($\dot{\Phi}$), yaw ($\Psi$) and yaw rate ($\dot{\Psi}$) signals to a flight control system 16 of an aircraft so as to provide a fail operational attitude sensing system. Since they are identical, only IRS 12 will be described.

Within IRS 12 a Global Position System GPS receiver 20 is shown having three antennas 22, 24, and 26 for receiving signals from the satellites either directly or through a ground based transceiver. GPS 20 may be like that commonly sold by Honeywell and an output indicative of pitch, roll and yaw as sensed by GPS 20 is produced on a line 28 which is presented to a comparator 30.

Also within IRS 12 an inertial reference unit IRU 40 is shown. IRU 40 contains a three axis gyro and an accelerometer unit such as is commonly sold by Honeywell Inc. and an output indicative of pitch, roll and yaw as sensed by IRU 40 is produced on a line 42 to the FCS 16 and, via a line 44, to the comparator 30.

Comparator 30 contains an algorithm which compares or determines the difference between the pitch, roll and yaw and the aircraft body rates ($\Theta$, $\Phi$, and $\Psi$) outputs as produced by the GPS 20 and the IRU 40 and determines whether they are the same within a certain predetermined amount of variance. If they are within the circle of confidence, then a "valid" signal is released from comparator 30 on a line 44 to the FCS 16 so that FCS 16 knows that the pitch roll and yaw signals from IRU on line 42 are valid.

In a similar fashion, pitch roll and yaw signals from IRS 14 are presented to FCS 16 over a line 46 and "valid" signals are presented from IRS 14 to FCS 16 on a line 48.

It should be noted that there is no "common mode" errors possible since IRU 40 responds to different factors than GPS 20. Thus a "valid" signal will always mean that the yaw pitch and roll signals from the IRS's 12 and 14 are truly valid. It is also seen that each IRS is, in fact, a "fail safe" system since any error whether in the GPS or the IRU will result in no "valid" signal.

Thus, FCS 16 receives two sets of pitch, roll and yaw signals and two "valid" signals from IRS 12 and IRS 14 when all systems are working properly. In the event that an error occurred in either IRS 12 or IRS 14, no "valid" signal would be presented by the faulty IRS and FCS 16 would use the signals from the other IRS. If both IRS's 12 and 14 were subjected to an error, then no "valid" signal would be presented to FCS at all and it would be known that none of the signals could be relied on.

It is seen that I have provided a fail operational system without common mode errors for the attitude and position control of an aircraft that can be directly incorporated in the existing fail operational systems on aircraft. It is also seen that the invention has uses other than for aircraft control and that those skilled in the art will find many changes and modifications to the disclosures used in connection with the preferred embodiment without departing from the scope of the invention.

The embodiments of the invention in which an exclusive property or right is claimed are defined as follows:

1. A fully monitored system comprising:

a first sensing unit responsive to a first set of variables to produce a first output indicative of a condition;

a second sensing unit responsive to a second set of variables different from the first set of variables to produce a second output indicative of the condition;

comparing means receiving the first and second outputs and producing a valid output only if the first and second outputs are substantially the same.

2. Apparatus according to claim 1 further including receiving means connected to receive one of the first and second outputs and connected to the comparing means to receive the valid output to indicate that the one of the first and second outputs is valid.

3. Apparatus according to claim 2 wherein the first sensing unit is an inertial reference unit, the second sensing unit is a global position sensor and the receiving means is the flight control system of an aircraft.

4. Apparatus according to claim 3 wherein the first set of variables is the output of a plurality of gyroscopes and accelerometers, and the second set of variables is the signals from satellites.

5. Apparatus according to claim 4 wherein the first and second outputs relate to aircraft attitude and attitude rate.

6. Apparatus according to claim 5 wherein the first and second outputs relate to aircraft position.

7. Apparatus according to claim 2 further including a second fully monitored system having a third sensing unit like the first sensing unit and responsive to the first set of variables to produce a third output indicative of the condition, having a fourth sensing unit like the second sensing unit and responsive to the second set of variables to produce a fourth output indicative of the condition, and having a second comparator operable to produce a second valid output only when the third and fourth output are substantially the same, said receiving means receiving one of the third and fourth outputs and the second valid output to indicate that the one of the third and fourth outputs is valid.

* * * * *

(12) EX PARTE REEXAMINATION CERTIFICATE (8116th)

United States Patent
Hartman et al.

(10) Number: US 5,631,656 C1
(45) Certificate Issued: Mar. 29, 2011

(54) FAIL SAFE SYSTEM WITH COMMON MODE AVOIDANCE

(75) Inventors: Randolph G. Hartman, Plymouth, MN (US); Robert D. Girts, Mesa, AZ (US)

(73) Assignee: Honeywell Inc., Minneapolis, MN (US)

Reexamination Request:
No. 90/011,034, Jun. 14, 2010

Reexamination Certificate for:
Patent No.: 5,631,656
Issued: May 20, 1997
Appl. No.: 08/397,297
Filed: Mar. 1, 1995

(51) Int. Cl.
*G01S 1/00* (2006.01)
*G01S 1/02* (2006.01)

(52) U.S. Cl. .................. 342/357.32; 342/173; 701/29

(58) Field of Classification Search ............ 342/357
See application file for complete search history.

(56) References Cited

U.S. PATENT DOCUMENTS 5,184,304 A    2/1993   Huddle

FOREIGN PATENT DOCUMENTS

| JP | SHOU 62-298717 | 12/1987 |
| JP | 62-298717 | 12/1987 |
| JP | 01-316607 | 12/1989 |
| JP | HEI 01-316607 | 12/1989 |

*Primary Examiner*—Colin LaRose

(57) ABSTRACT

A fail operational system including two sets of first and second sensors responsive to different stimuli to produce signals indicative of a condition, and a comparator for comparing the outputs of the first and second sensors to produce a "valid" signal when the outputs are substantially the same.

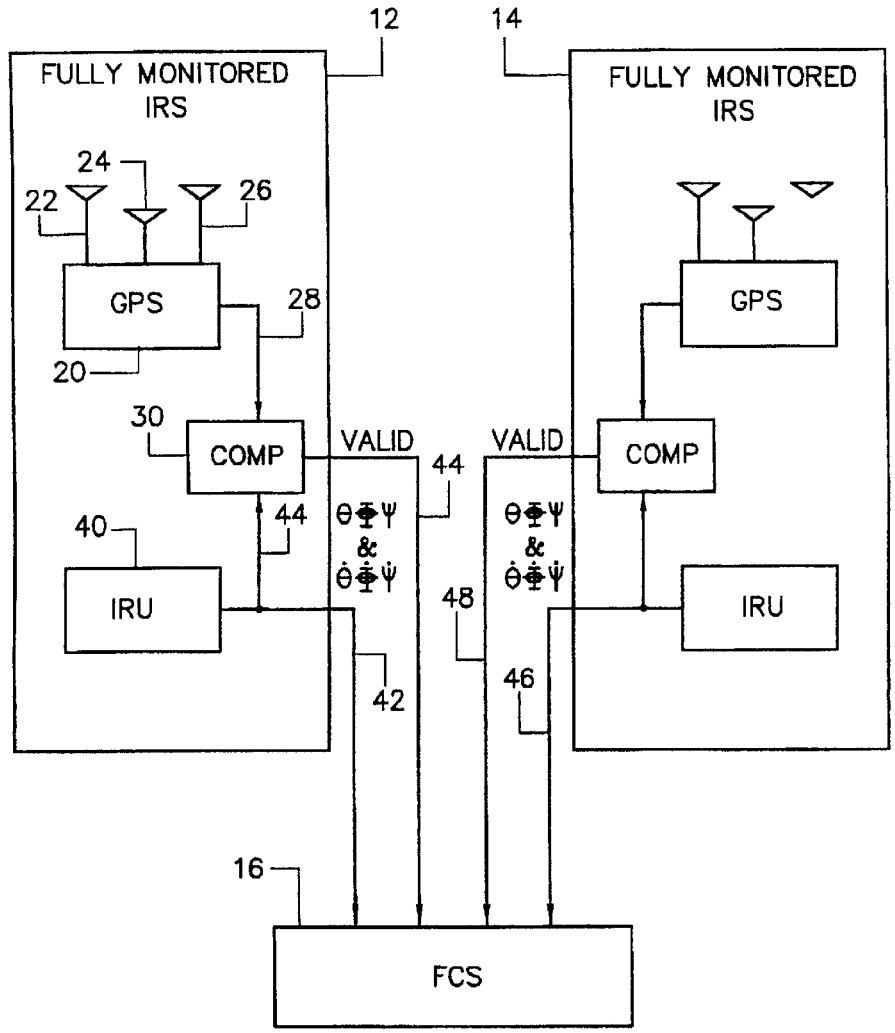

US 5,631,656 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7 is confirmed.

New claims 8-34 are added and determined to be patentable.

8. *The system of claim 1, further comprising:*
*receiving means coupled to the comparing means;*
*wherein the receiving means is configured to receive the valid output, the first output, and the second output.*
9. *The system of claim 8, wherein the receiving means and the comparing means are part of the same system.*
10. *The system of claim 8, wherein the first sensing unit is an intertial reference unit, the second sensing unit is a global positioning system, and the receiving means is a system for providing information indicative of the position and attitude of a vehicle.*
11. *The system of claim 8, wherein the global position system includes three antennas.*
12. *The system of claim 1, wherein the first sensing unit is an inertial reference unit and the second sensing unit is a global position system.*
13. *The system of claim 12, wherein the inertial reference unit produces an output indicative of one or more of the pitch, roll, and yaw of a vehicle.*
14. *The system of claim 12, wherein the inertial reference unit produces an output indicative of the position of a vehicle.*
15. *The system of claim 12, wherein the inertial reference unit comprises at least one gyro and at least one accelerometer.*
16. *The system of claim 12, wherein the global position system produces an output indicative of one or more of the pitch, roll, and yaw of a vehicle.*
17. *The system of claim 16, wherein the output of the global position system is used by the comparing means to check the first output from the inertial reference unit.*
18. *The system of claim 12, wherein the global position system produces an output indicative of the position of a vehicle.*
19. *The system of claim 12, wherein the global position system includes three antennas.*
20. *The apparatus of claim 12, wherein the first set of variables comprises the output of one or more inertial sensors, and the second set of variables comprises signals from global position system satellites.*
21. *The apparatus of claim 20, wherein the first output comprises an output indicative of pitch, roll, and yaw as sensed by the global position system and the second output comprises an output indicative of pitch, roll, and yaw as sensed by the inertial reference unit.*
22. *The apparatus of claim 12, wherein the inertial reference unit comprises a plurality of inertial sensors.*
23. *The apparatus of claim 12, wherein the first output comprises a position of a vehicle as sensed by the global position system and the second output comprises a position of a vehicle as sensed by the inertial reference unit.*
24. *The apparatus of claim 23, wherein the comparing means is configured to produce a valid output only if the position from the global position system and the position from the inertial reference unit are substantially the same.*
25. *The apparatus of claim 12, wherein the first output comprises an attitude of a vehicle as sensed by the global position system and the second output comprises an attitude of a vehicle as sensed by the inertial reference unit.*
26. *The apparatus of claim 25, wherein the comparing means is configured to produce a valid output only if the attitude from the global position system and the attitude from the inertial reference unit are substantially the same.*
27. *The apparatus of claim 12, wherein the first output comprises an attitude and a position of a vehicle as sensed by the global position system and the second output comprises an attitude and a position of a vehicle as sensed by the inertial reference unit.*
28. *The apparatus of claim 27, wherein the comparing means is configured to produce a valid output only if the position and attitude from the global position system and the position and attitude from the inertial reference unit are substantially the same.*
29. *The system of claim 1, wherein the first sensing unit and the second sensing unit are dissimilar sensing systems.*
30. *The system of claim 29, wherein the first sensing unit and the second sensing unit are responsive to different measurement and computational techniques.*
31. *The apparatus of claim 1, wherein the comparing means is configured to determine the difference between the first output and the second output.*
32. *The apparatus of claim 1, wherein producing a valid output comprises generating an indication that the output from the first sensing unit or the second sensing unit is sufficiently accurate.*
33. *A fully monitored system for a vehicle, comprising:*
*an interial reference unit operating to produce a first output based at least in part on an attitude of the vehicle;*
*a global position system operating to produce a second output based at least in part on the attitude of the vehicle; and*
*a comparator receiving the first and second outputs and producing a valid signal only if the first and second outputs are substantially the same.*
34. *A fully monitored system comprising:*
*an intertial reference unit responsive to the output of one or more inertial sensors, the inertial reference unit adapted to produce a first output indicative of the attitude of a vehicle; and*
*a global position system receiver responsive to the output of global position system satellites, the global position system receiver adapted to produce a second output indicative of the attitude of the vehicle,*
*wherein the system includes a comparator that determines the difference between the first and second outputs and indicates that the information from the inertial reference unit or the global position system receiver is valid only if the first and second outputs are substantially the same.*

* * * * *